United States Patent
Miandoab et al.

(10) Patent No.: US 6,854,447 B2
(45) Date of Patent: Feb. 15, 2005

(54) CORRUGATED INTERNAL FUEL RAIL DAMPER

(75) Inventors: Farid Heidari Miandoab, Clifton Park, NY (US); Hamid Sayar, Newport News, VA (US)

(73) Assignee: Siemens VDO Automotive Corp., Auburn Hills, MI (US)

( * ) Notice: Subject to any disclaimer, the term of this patent is extended or adjusted under 35 U.S.C. 154(b) by 231 days.

(21) Appl. No.: 10/014,441

(22) Filed: Dec. 14, 2001

(65) Prior Publication Data

US 2003/0111056 A1 Jun. 19, 2003

(51) Int. Cl.[7] ............................................. F02M 37/04
(52) U.S. Cl. ...................................... 123/467; 123/456
(58) Field of Search ................................ 123/456, 467, 123/447; 138/28, 30, 108, 112

(56) References Cited

U.S. PATENT DOCUMENTS

| | | | |
|---|---|---|---|
| 2,779,353 A | 1/1957 | Coffey | 138/26 |
| 3,878,867 A | 4/1975 | Dirks | 138/30 |
| 4,056,679 A * | 11/1977 | Brandt et al. | 174/13 |
| 4,287,917 A | 9/1981 | Frey | 138/30 |
| 4,649,884 A | 3/1987 | Tuckey | 123/457 |
| 4,651,781 A | 3/1987 | Kandelman | |
| 4,660,524 A | 4/1987 | Bertsch et al. | 123/468 |
| 4,911,204 A | 3/1990 | Martin | 138/30 |
| 4,951,636 A | 8/1990 | Tuckey et al. | 123/497 |
| 5,460,438 A | 10/1995 | Hellmann et al. | 303/119.2 |
| 5,575,262 A * | 11/1996 | Rohde | 123/467 |
| 5,617,827 A * | 4/1997 | Eshleman et al. | 123/456 |
| 5,709,248 A | 1/1998 | Goloff | |
| 5,730,506 A | 3/1998 | Friedow et al. | 303/87 |
| 5,845,621 A | 12/1998 | Robinson et al. | |
| 5,896,843 A | 4/1999 | Lorraine | |
| 5,904,181 A | 5/1999 | Tooma et al. | 138/30 |
| 6,314,942 B1 | 11/2001 | Kilgore et al. | |
| 6,321,719 B1 | 11/2001 | Schwegler | |
| 6,371,083 B1 | 4/2002 | Rossi et al. | |
| 6,390,131 B1 | 5/2002 | Kilgore | |
| 6,443,131 B1 * | 9/2002 | Bueser | 123/467 |
| 6,513,500 B2 | 2/2003 | Braun et al. | |
| 6,568,370 B1 * | 5/2003 | Treusch et al. | 123/467 |
| 6,672,286 B2 * | 1/2004 | Miandoab et al. | 123/456 |
| 2002/0139426 A1 | 10/2002 | Kippe et al. | |

* cited by examiner

Primary Examiner—Carl S. Miller

(57) ABSTRACT

A fuel rail that forms a conduit for pressurized fuel to be delivered to at least one fuel injector. The fuel rail includes an elongated member that is corrugated such that the fuel rail acts as a pressure damper. A method of reducing pressure pulsation in a fuel system is achieved by configuring a fuel of a second configuration from an initial configuration, the second configuration having a first portion and a second portion, the first portion having at least three points defining a virtual plane, the first portion including a continuous surface that intersects the virtual plane at a plurality of positions.

34 Claims, 4 Drawing Sheets

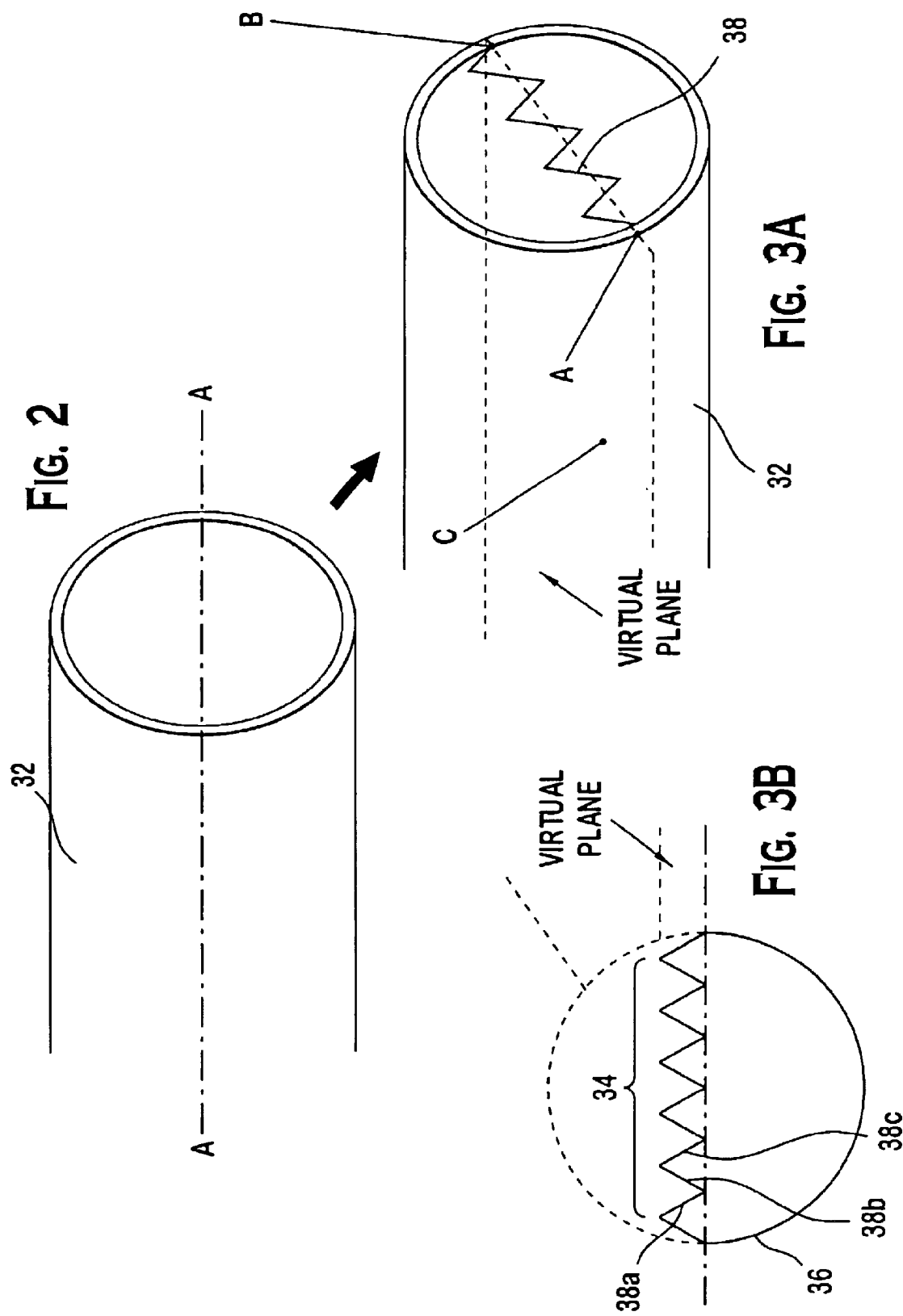

CORRUGATED INTERNAL FUEL RAIL DAMPER

BACKGROUND OF THE INVENTION

In fuel rails for injector-based fuel injection systems, various devices associated with the fuel system cause pressure waves in the fuel to propagate through the fuel rails. Such pressure waves, if occurring at the wrong time, may cause a reduction in the fuel being injected into the engine when the injector is pulsed open causing a lean shift condition. In certain instances, the fuel injector may have a small amount of fuel leaving the fuel rail and being injected into the engine at the time the injector is pulsed open causing a rich shift condition. In addition, such pressure waves cause noise in the system that may be objectionable. Pressure pulses will give false readings to fuel pressure regulators by operating the regulator with a false indication of fuel pressure, which may result in fuel being bypassed and returned to the fuel tank.

A known pressure dampening system uses elastic walls forming the fuel supply line. As pressure pulses occur, the elastic walls function to dampen the pressure pulsations. Other pressure dampening systems use a pressure damper plugged in the end of a fuel rail with a pressure regulator at the other end. Still other pressure dampening systems use a compliant member operable to reduce peak pressure during injector firing events. The member is positioned in the fuel rail so as to not adversely affect the flow of fuel to an injector opening in the rail. The member is not free to rotate in the rail and the member dampens the pressure pulses, which is a pair of welded together shell halves with an enclosed airspace. Other pressure dampening systems use an in-line fuel pressure damper from the outlet of the fuel filter to the fuel rail. The damper is a pressure accumulator which operative to reduce transient pressure fluctuations induced by the fuel pump and the opening and closing of the fuel injectors.

Another dampening system utilizes an integral pressure damper that is attached to the fuel rail. The return tube is brazed to the rail and then at a convenient time in the process, the damper, which is a diaphragm, is attached to the return tube and crimped into position. The diaphragm operates to reduce audible operating noise produced by the injector pressure pulsations.

Still another dampening system uses a pulse damper in the fuel pump comprising a hollow body formed of a thin walled tube of flexible and resilient plastic material with heat sealed ends forming at least one chamber. The chamber carries a compressible gas to dampen pressure pulsations. Another dampening system uses a bellows modulator inside a gear rotor fuel pump for reducing pump noise by reducing the amplitude of fuel pressure pulses. Yet another system uses a bellows-like device at the junction of the lines of the flow path of the fluid from a fuel feed pump thereby forming a discontinuity in the flow path to reduce compressional vibrations of fuel being conveyed.

SUMMARY OF THE INVENTION

Briefly, the present invention provides a fuel rail for a fuel injection system, which fuel rail can also function as a pressure damper. The fuel injection system includes a source of pressurized fuel and at least one fuel injector. The fuel rail comprises an elongated member having a longitudinal axis extending therethrough. The elongated member includes a continuous outer surface surrounding a continuous inner surface, the continuous inner surface cincturing the longitudinal axis and defining an interior volume, the continuous inner surface being exposed to the interior volume and having an uniform composition with at least one undulation disposed about the longitudinal axis.

The present invention provides a method of reducing pressure pulsation in a fuel injection system having a pressurized fuel source coupled to at least one fuel injector with a fuel rail establishing fluid communication between the pressurized fuel source and the at least one fuel injector, the fuel rail extending along a longitudinal axis. In one preferred embodiment of the invention, the method is achieved by providing an elongated member that extends along the longitudinal axis, the elongated member having a continuous inner surface and a continuous outer surface of an uniform composition cincturing the longitudinal axis, the continuous inner surface defining a first predetermined internal volume of a first configuration of the fuel rail; and corrugating a first portion of the elongated member so as to define a second predetermined internal volume of a second configuration of the fuel rail.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

FIG. 2 is an illustration of a preferred embodiment of the fuel rail in its initial configuration prior to any changes in its configuration.

FIG. 3A is an illustration of the fuel rail of FIG. 2 in a second configuration.

FIG. 3B is a cross-sectional view of FIG. 3.

Figure 1:
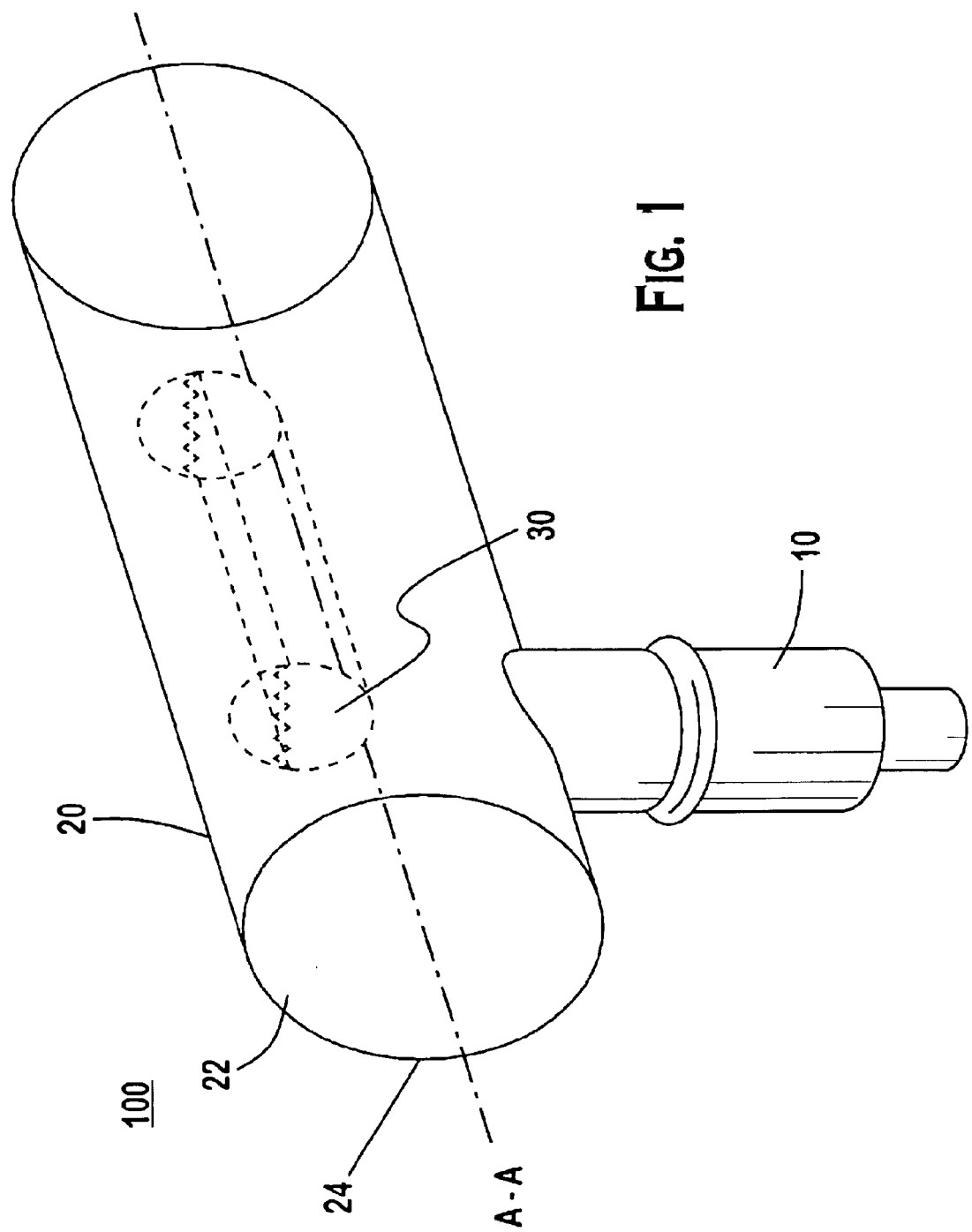
FIG. 1 is an illustration of the fuel system according to a preferred embodiment.

FIGS. 5A, 5B, 5C, and 5D illustrate various curved surfaces that approximate various trigonometric functions for the preferred embodiment.

DETAILED DESCRIPTION OF THE PREFERRED EMBODIMENTS

Referring to FIGS. 1–5, there is shown a fuel rail 100 according to a preferred embodiment that can be coupled to a pressurized fuel source (not shown) and at least one fuel injector 10. The fuel rail 100 includes a fuel rail 20' in a first configuration having a first predetermined internal volume that is changed to a second configuration 20 having a second predetermined internal volume. In either configuration, the fuel rail includes a longitudinal rail axis A—A extending therethrough, the fuel rail 20 having an interior surface 22 and an exterior surface 24 that constitute an uniform composition extending between the interior surface 22 and the exterior surface. The uniform composition can be of varying thickness or a constant thickness. Preferably, the uniform composition is of a constant thickness.

The interior surface 22 and the exterior surface 24 cincture the longitudinal axis A—A and define a fuel rail volume capable of receiving fuel that can be supplied by a pressurized fuel supply. The fuel rail 20, in the second configuration, operates to absorb fuel pressure fluctuations within the fuel system. In the first configuration, the fuel rail 20' has an interior volume and an exterior surface 24 defined by a continuous wall surface 26, as seen in a cross-section view of FIG. 3A.

The continuous wall surface of the fuel rail 20 includes a first portion 30 and a second portion 32 continuous with each other. Preferably, the first portion includes a first continuous inner surface 30a and first continuous outer surface 30b with a first thickness t, between the surfaces, the second portion 32 includes a second continuous inner surface 32a and a second continuous outer surface 32b with a second thickness $t_2$ between the surfaces. In the preferred embodiments, the first thickness $t_1$ is substantially equal to the second thickness $t_2$.

The first portion 30 preferably includes a series of undulations formed by the first continuous inner surface 30a and the first continuous outer surface 30b extending across the first portion 30. The second portion preferably includes a smooth second continuous inner surface 32a and a smooth second continuous outer surface 32b. As used here the term smooth surface includes surfaces that have irregularities on its planar or curved surface but which irregularities can be quantified as a surface roughness $R_a$ of no greater than 320 micrometer. Preferably, the first portion 30 has undulations or a corrugated surface formed thereon that is located on the first portion 30 by a virtual plane containing at least three points "A", "B" and "C" between a first end contiguous to an exterior surface 32 of fuel rail 20 and a second end contiguous to the exterior surface 32 of the first portion 30 such that a continuous surface, preferably a single continuous surface, must intersect the virtual plane at a plurality of locations between the first end and the second end. It should be noted here that the three points could be any arbitrary point as long as the three arbitrary points define a virtual plane that is intersected by a continuous surface at three or more positions. Preferably, the continuous surface comprises stacked surfaces that are oblique to the virtual plane so as to form a corrugated surface across the virtual plane. The stacked surfaces can be, for example, a sawtooth pattern or a series of rounded tooth pattern. Alternatively, the corrugated surfaces include a continuous surface that forms a plurality of planar surfaces (38a, 38b, 38c and so on) that are oblique to the virtual plane.

Preferably, the undulations extend across the first portion 30 such that the surface of the first portion 30 has no planar surface parallel to a surface of the second portion. Where the undulations include a plurality of planar surfaces, it should be noted that the plurality of planar surfaces include a series of planar surfaces adjacent to one another such that every planar surface (38a) is parallel to every other planar surface (38c) in the series of planar surfaces.

In one preferred embodiment, the second portion 32 of the fuel rail 20 includes a surface with a constant radius of curvature with respect to the axis of the fuel rail 20 or to any axis, shown here in FIG. 3A. Preferably, the first and second portion are formed from a single continuous surface of a suitable elongated member, as shown in FIG. 2, that can be formed by stamping or rolling a portion of the elongated member. It should be noted here that a suitable elongated member could have a cross-section that is circular, square, rectangular, triangular or other polygons. Preferably, the cross-section of the elongated member in its initial configuration is circular.

The stamping or rolling of the elongated member 20' is performed so as to generate an elongate member 20 having first portion 30 with the corrugated surface while leaving the remainder of the elongated member in, preferably, the same shape as prior to the forming operation that defines the first portion 30. The stamping or rolling operation can be done by metal forming the first portion 30 between two or more rollers or stamping dies. It should be recognized that an internal volume of the elongated member of FIG. 2, in the initial configuration, is changed to a different second internal volume subsequent to the forming operation. Preferably the second internal volume can be configured such that the internal volume of the initial configuration is preferably greater than the second internal volume.

Depending on the operating conditions that the fuel rail 20 is subjected to, the flexibility of the fuel rail 20 can be a function of the wall thickness of the elongated member and the percentage of the surface area of the elongated member that is corrugated. Preferably, the elongated member is a tubular member having a diameter that can be about twenty millimeter, with a thickness of the elongated member ranging from about two millimeter, such that when the elongated member 20' is configured into the fuel rail damper 20, a proportion of the corrugated surface area of the damper is approximately 25% to 50% of the exterior surface area of the elongated member and the internal volume of the fuel rail damper 20 can be from 25% to 90% of the internal volume of the elongated member 20'. Also desirably, the wall thickness of the first portion 30 should be approximately the same as the wall thickness of the second portion. It should be noted that other thickness, diameter and ratios could be varied depending on operating conditions or other requirements as known to those skilled in the art and which are within the scope of the preferred embodiments.

The first and second portions together define a continuous outer surface and a continuous inner surface, the continuous inner surface enclosing a predetermined internal volume that is sealed from the exterior of the fuel rail 20. The predetermined internal volume can be used to determine the amount of damping required for the pressure pulsation within the fuel rail 20. A combination of a spring constant of the corrugated surface, the elasticity of the first portion 30 or the second portion 32 can dampen or absorb the pressure pulsations. Where the fuel rail is used in a non-return fuel system, the fuel rail 20 can be hermetically sealed by a suitable fastening technique, such as, for example, crimping, epoxy, gluing, brazing, bonding, welding and preferably laser welding of the elongated member. It should be understood that any suitable coupling technique could be employed such as, for example, a fastener as in a rivet or a bolt and nuts configuration.

Figure 4A:
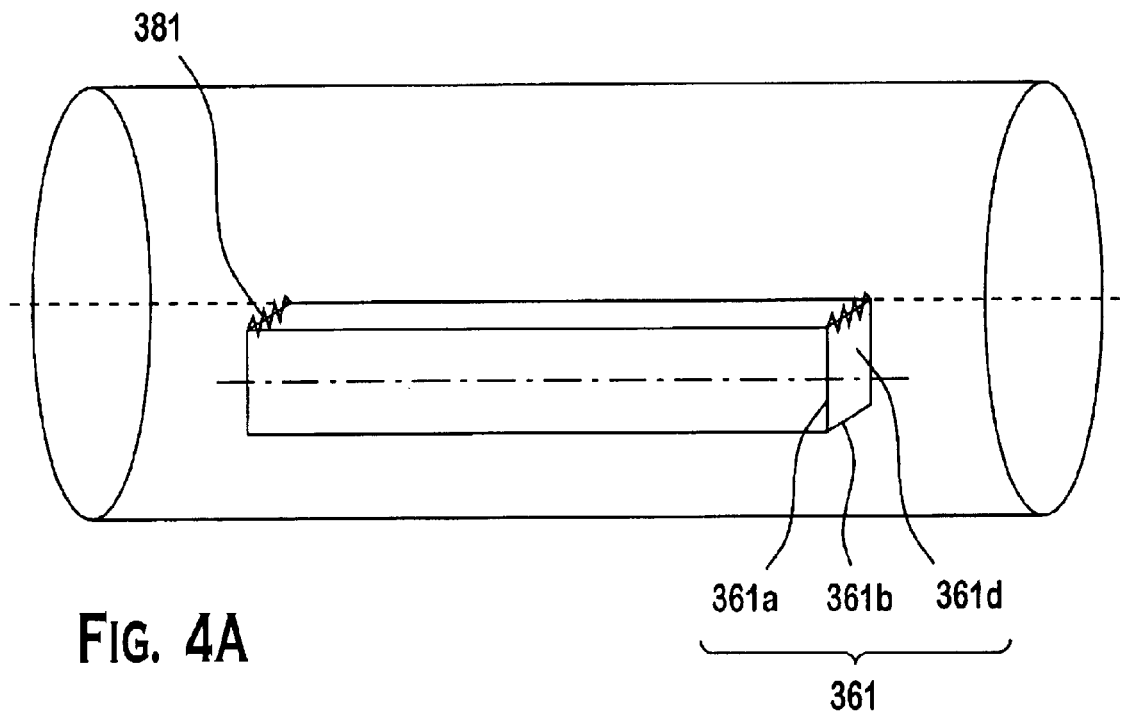
FIG. 4A is an illustration of another embodiment of the fuel rail.
Figure 4B:
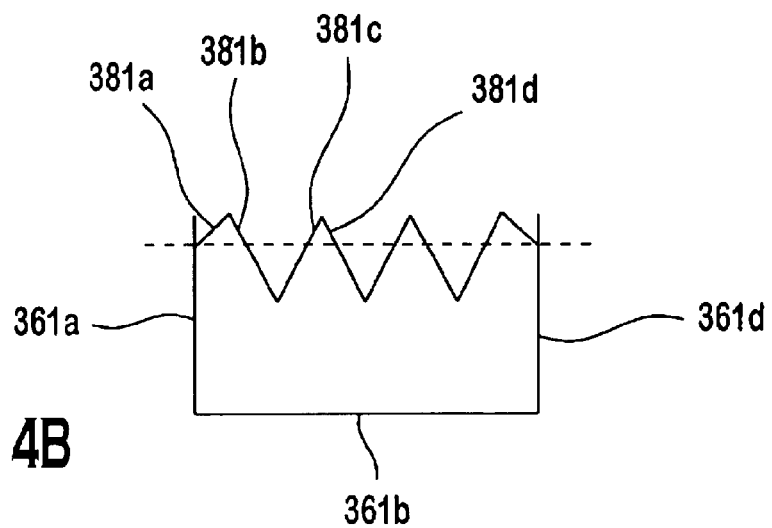
FIG. 4B is a cross-sectional view of the fuel rail shown in FIG. 4A.

Referring to FIGS. 4A and 4B, the fuel rail can be a polygonal cross-section tube 40' having a first predetermined internal volume that is corrugated into a fuel rail configuration, shown here in solid line, 40 having a second predetermined internal volume that is less than the first predetermined internal volume. It should be noted that the two-dimensional cross-section can be any suitable polygons, including a rectangular polygon 40 as shown in FIG. 4A. The fuel rail 40 has a continuous wall surface 50 that can include a first portion 52 and a second portion 54. Here, the first portion has a first continuous inner surface 52a and a first continuous outer surface 52b with a thickness $t_3$ separating the surfaces 52a and 52b. The second portion 54 has a second continuous inner surface 54a and a second continuous outer surface 54b with a thickness 4 separating the two surfaces. The first portion 52 is corrugated so as to include at least three planar surfaces 521, 522, 523, 524 and so on (FIG. 4B) extending across a virtual planes that define a second predetermined volume of the fuel rail 20.

Alternatively, the corrugated surfaces of the first portion 52 can include various surfaces having other cross-sections as described above with respect to FIGS. 3A, 3B and 5A–5D.

Figure 5A:
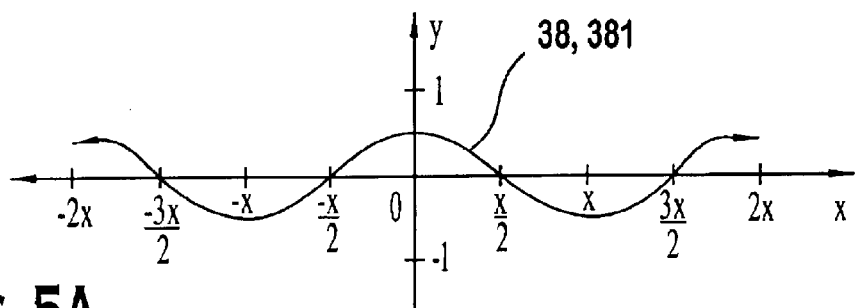
Figure 5B:
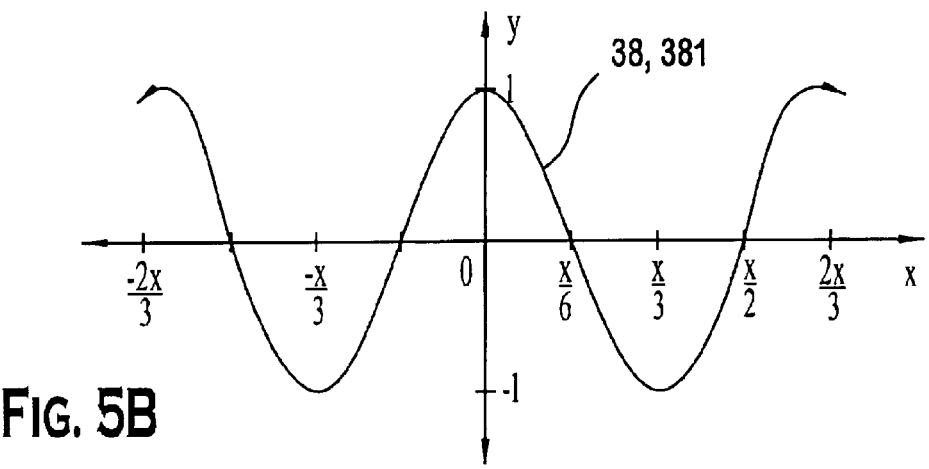
Figure 5C:
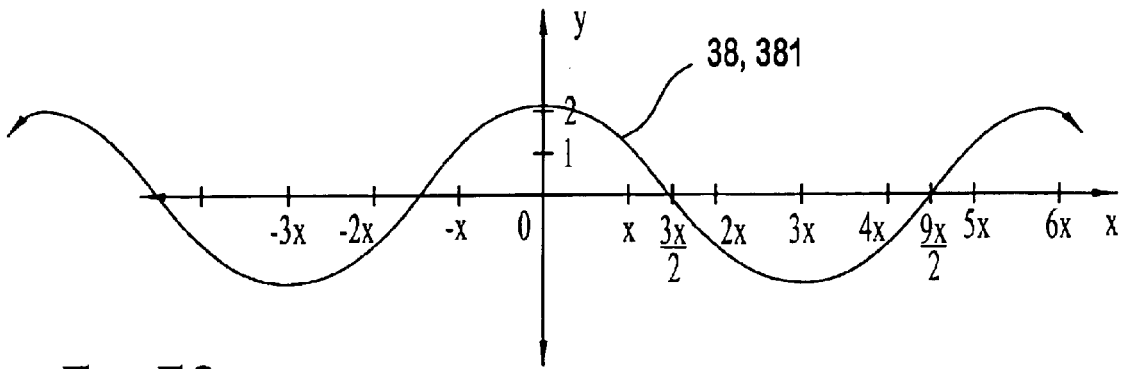
Figure 5D:
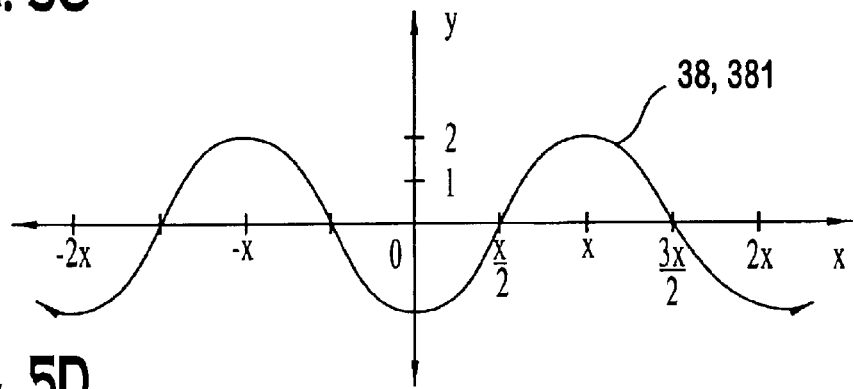

Referring to FIGS. 5A–5C, the continuous surface that forms the respective first portion 30 or 52 can have cross-sectional shapes that approximate various trigonometric functions. For example, in FIG. 5A, one cross-sectional shape of the respective first portion 30 or 52 can approximate the function y=½ cos x where y is the amplitude and x is any real number. In another example, the cross-sectional shape can approximate the function y=cos 3x, as shown here in FIG. 5B. In a third example, the cross-sectional shape can approximate y=2 cos ⅓x, as shown here in FIG. 5C. In a fourth example, the cross-sectional shape can approximate y=−2 cos x. Other examples using other functions, such as, for example, a sine function can be used depending on the number of corrugations, flexibility or operating characteristics as required. It should be recognized by those skilled in the art that the shape of the surface could be varied depending on the application of the damper and are within the scope of the preferred embodiments.

The method of damping pressure pulsations in a fuel injection system includes providing an elongated member that extends along the longitudinal axis. The elongated member, preferably a circular tube, having a continuous exterior surface and a continuous interior surface defining a first predetermined internal volume of a first configuration of the fuel rail. The tube has a portion, a first portion, of its surface corrugated to form a series of undulations extending across the entire first portion such that the first predetermined internal volume is changed to a second predetermined internal volume that is less than the first predetermined internal volume and, preferably, can be from about 25% to 90% of the first predetermined internal volume. The tube can be of cross-sections other than circular as described in one of the preferred embodiments. The method includes providing a plurality of corrugated fuel rail with different dimensions (i.e. thickness, corrugations, surface area, cross sections and internal volumes) and selecting one of the plurality of the corrugated fuel rail so as to optimize the damping of a fuel rail pressure.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A fuel rail assembly comprising:
    a fuel rail having a longitudinal rail axis extending therethrough, the fuel rail having a fuel rail volume capable of receiving fuel; and
    a fuel damper element disposed within the fuel rail and having a longitudinal damper element axis generally parallel to the longitudinal rail axis, the fuel damper element having a first portion and a second portion, the first portion including a continuous surface having a series of undulations extending along the longitudinal damper element axis, and the second portion having a smooth surface extending along the longitudinal damper element axis so that the first and second portions are spaced from the longitudinal damper element axis.

2. The fuel rail assembly of claim 1, wherein the first portion further comprises at least three points defining a virtual plane so that the continuous surfaced intersects the virtual plane at three or more locations.

3. The fuel rail assembly according to claim 1, wherein the second portion includes a surface with a constant radius of curvature.

4. The fuel rail assembly according to claim 1, wherein the second portion includes a surface with a constant radius of curvature with respect to at least one of the longitudinal fuel rail axis and the longitudinal damper element axis.

5. The fuel rail assembly according to claim 1, wherein the first portion and a second portion are coupled together so as to define an outer surface and an inner surface, the inner surface enclosing a predetermined volume.

6. The fuel rail assembly according to claim 5, wherein the predetermined volume is sealed from fluid communication with the fuel rail volume.

7. The fuel rail assembly according to claim 5, wherein the first portion and the second portion comprise an integral member.

8. The fuel rail assembly according to claim 5, wherein the predetermined volume includes a predetermined volume of at least one of air and nitrogen.

9. The fuel rail assembly according to claim 1, wherein a cross section of the second portion being coupled to the first portion define a close ended two dimensional shape of at least three sides that touch only at their end points.

10. The fuel rail assembly according to claim 1, wherein the second portion includes at least three planar surfaces that are coupled to the first portion so as to define a predetermined volume.

11. A fuel rail assembly comprising:
    a fuel rail having a longitudinal rail axis extending therethrough, the fuel rail having a fuel rail volume capable of receiving fuel; and
    a fuel damper element disposed within the fuel rail and having a longitudinal damper element axis generally parallel to the longitudinal rail axis, the fuel damper element having a first portion and a second portion having a smooth surface;
    the first portion includes at least three points defining a virtual plane and a continuous surface intersecting the virtual plane at three or more locations, the continuous surface comprising a series of undulations and obliquely stacked surfaces that form a corrugated surface across the virtual plane.

12. A fuel rail assembly comprising:
    a fuel rail having a longitudinal rail axis extending therethrough, the fuel rail having a fuel rail volume capable of receiving fuel; and
    a fuel damper element disposed within the fuel rail and having a longitudinal damper element axis generally parallel to the longitudinal rail axis, the fuel damper element having a first portion and a second portion having a smooth surface;
    the first portion includes at least three points defining a virtual plane and a continuous surface intersecting the virtual plane at three or more locations, the continuous surface comprising a series of undulations and a plurality of planar surfaces oblique to the virtual plane and each planar surface being oblique to adjacent planar surfaces.

13. The fuel rail assembly according to claim 11, wherein the plurality of planar surfaces comprises a series of planar surfaces adjacent to one another such that every planar surface is parallel to every other planar surface in the series of planar surfaces.

14. The fuel rail assembly according to claim 1, wherein the continuous surface comprises a series of curved surfaces such that a cross section of the series of curved surfaces describes at least one curve approximating at least one function y=a*cos*x and y=a*sin*x as plotted over a coordinate plane where y is the amplitude of curve, x is a predefined interval and a is any real number.

15. A damper element for use in a fuel rail, the damper element comprising:

an elongated member having a longitudinal damper element axis generally parallel to the longitudinal rail axis, the elongated member having a first portion and a second portion, the first portion including a continuous surface having a series of undulations extending along the longitudinal damper element axis, and the second portion having a smooth surface extending along the longitudinal damper element axis so that the first and second portions are spaced from the longitudinal damper element axis.

16. The damper element of claim 15, wherein the first portion further comprises at least three points defining a virtual plane, the first portion including a continuous surface that intersects the virtual plane at three or more locations.

17. The damper element of claim 15, wherein the second portion includes a surface with a constant radius of curvature.

18. The damper element of claim 15, wherein the second portion includes a surface with a constant radius of curvature with respect to at least one of the longitudinal fuel rail axis and the longitudinal damper element axis.

19. The damper element of claim 15, wherein the first portion and a second portion are coupled together so as to define an outer surface and an inner surface, the inner surface enclosing a predetermined volume.

20. The damper element of claim 19, wherein the predetermined volume is sealed from fluid communication with the fuel rail volume.

21. The damper element of claim 19, wherein the first portion and the second portion comprise an integral member.

22. The damper element of claim 19, wherein the predetermined volume includes a predetermined volume of at least one of air and nitrogen.

23. The damper element of claim 15, wherein a cross section of the second portion being coupled to the first portion define a close ended two dimensional shape of at least three sides that touch only at their end points.

24. The damper element of claim 15, wherein the second portion includes at least three planar surfaces that are coupled to the first portion so as to define a predetermined volume.

25. A damper element for use in a fuel rail damper element comprising:

an elongated member having a longitudinal damper element axis generally parallel to the longitudinal rail axis, the elongated member having a first portion and a second portion having a smooth surface, the first portion including at least three points defining, a virtual plane and a continuous surface that intersects the virtual plane at three or more locations, the continuous surface comprising a series of undulations and obliquely stacked surfaces that form a corrugated surface across the virtual plane.

26. A damper element for use in a fuel rail damper element comprising:

an elongated member having a longitudinal damper element axis generally parallel to the longitudinal rail axis, the elongated member having a first portion and a second portion having a smooth surface, the first portion including at least three points defining a virtual plane and a continuous surface that intersects the virtual plane at three or more locations, the continuous surface comprising a series of undulations and a plurality of planar surfaces oblique to the virtual plane.

27. The fuel rail assembly according to claim 26, wherein the plurality of planar surfaces comprises a series of planar surfaces adjacent to one another such that every planar surface is parallel to every other planar surface in the series of planar surfaces.

28. The fuel rail assembly according to claim 15, wherein the continuous surface comprises a series of curved surfaces such that a cross section of the series of curved surfaces describe at least one curve approximating at least one function $y=a*\cos*x$ and $y=a*\sin*x$ as plotted over a coordinate plane where y is the amplitude of curve, x is a predefined interval and a is any real number.

29. A method of damping pressure pulsations in a fuel injection system having a pressurized fuel source coupled to at least one fuel injector with a fuel rail establishing fluid communication between the pressurized fuel source and the at least one fuel injector, the fuel rail extending along rail axis, the method comprising:

providing a fuel rail having a predetermined internal volume;

changing the predetermined internal volume of the fuel rail with placement of at least one damper element having a longitudinal damper element axis generally parallel to the rail axis, a first portion and a second portion, the first portion including a continuous surface having a series of undulations extending along the longitudinal damper element axis, and the second portion having a smooth surface extending along the longitudinal damper element axis so that the first and second portions are spaced from the longitudinal damper element axis.

30. The method of claim 29, wherein the changing further comprises changing a first internal volume of the at least one damper element in a first configuration to a second internal volume of the at least one damper element in a second configuration prior to placement of the at least one damper in the fuel rail.

31. The method of claim 30, wherein the changing further comprises configuring a plurality of damper element, each damper element having at least one of a different internal volume and a different cross-sectional shape.

32. The method of claim 30, wherein the first configuration includes an elongated tubular member.

33. A method of damping pressure pulsations in a fuel injection system having a pressurized fuel source coupled to at least one fuel injector with a fuel rail establishing fluid communication between the pressurized fuel source and the at least one fuel injector, the fuel rail extending along a rail axis, the method comprising:

providing a fuel rail having a predetermined internal volume;

changing the predetermined internal volume of the fuel rail with placement of at least one damper element having a longitudinal damper element axis generally parallel to the rail axis, a first portion and a second portion, the first portion includes a continuous surface having a series of undulations, and the second portion having a smooth surface, the changing further comprising changing a first internal volume of the at least one damper element in a first configuration including an elongated tubular member to a second internal volume of the at least one damper element in a second configuration prior to placement of the at least one damper in the fuel rail, the second configuration including a member having a curvilinear surface of constant radius contiguous to a planar member whose surface is corrugated.

34. The method of claim 30, wherein the changing further comprises preventing fluid communication between an exterior of the damper element and the second internal volume of the at least one damper element.

* * * * *